(12) United States Patent
Gary, Jr.

(10) Patent No.: US 10,581,490 B2
(45) Date of Patent: *Mar. 3, 2020

(54) APPLIANCE WITH NEAR FIELD COMMUNICATION AND DIAGNOSTICS

(71) Applicant: WHIRLPOOL CORPORATION, Benton Harbor, MI (US)

(72) Inventor: Wyndham Fairchild Gary, Jr., St. Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/423,268

(22) Filed: May 28, 2019

(65) Prior Publication Data
US 2019/0319673 A1   Oct. 17, 2019

Related U.S. Application Data

(63) Continuation of application No. 14/973,992, filed on Dec. 18, 2015, now Pat. No. 10,355,747.

(51) Int. Cl.
| | |
|---|---|
| *H04B 5/00* | (2006.01) |
| *G06Q 10/06* | (2012.01) |
| *G06Q 10/00* | (2012.01) |
| *G05B 15/02* | (2006.01) |

(52) U.S. Cl.
CPC ............ *H04B 5/0031* (2013.01); *G06Q 10/06* (2013.01); *G06Q 10/20* (2013.01); *G05B 15/02* (2013.01); *G05B 2219/2642* (2013.01); *G05B 2223/06* (2018.08)

(58) Field of Classification Search
CPC ............ G05B 15/02; G05B 2219/2642; G05B 2223/06; G06Q 10/06; G06Q 10/20; H04B 5/0031
USPC ........................................................ 702/184
See application file for complete search history.

(56) References Cited

U.S. PATENT DOCUMENTS

| | | | |
|---|---|---|---|
| 2008/0081608 A1* | 4/2008 | Findikli | ............. H04M 1/7253 455/425 |
| 2011/0074589 A1 | 3/2011 | Han et al. | |
| 2013/0299569 A1 | 11/2013 | Gentile et al. | |
| 2014/0065971 A1 | 3/2014 | Nonaka et al. | |
| 2014/0087660 A1 | 3/2014 | Kim et al. | |
| 2014/0087661 A1 | 3/2014 | Kim et al. | |
| 2014/0327523 A1 | 11/2014 | Daniel et al. | |

(Continued)

FOREIGN PATENT DOCUMENTS

CN   103276557 A   9/2013

*Primary Examiner* — Duy T Nguyen
(74) *Attorney, Agent, or Firm* — McGarry Bair PC

(57) ABSTRACT

An appliance can comprise a controller, a first memory, and a near field communication (NFC) tag having a second memory being coupled to the controller. The NFC tag is configured to dynamically set a web service address from an external server based upon a write command from a mobile device in communication with the NFC tag. The controller can parse the web service address to begin a set of diagnostic tests for the appliance and write a web service address to the NFC tag based upon a result of the diagnostic tests. The mobile device can read the written web service address and load a web page with detailed information for the particular appliance and the problem diagnosed therewith.

19 Claims, 5 Drawing Sheets

(56) References Cited

U.S. PATENT DOCUMENTS

2015/0358364 A1 12/2015 Lee
2016/0070629 A1* 3/2016 Basile ............... G06F 16/24578
 235/375

* cited by examiner

APPLIANCE WITH NEAR FIELD COMMUNICATION AND DIAGNOSTICS

CROSS-REFERENCE TO RELATED APPLICATION(S)

This application claims priority to and is a continuation of U.S. patent application Ser. No. 14/973,992, filed Dec. 18, 2015, now U.S. Pat. No. 10,355,747, issued Jul. 16, 2019, which is incorporated herein by reference in its entirety.

BACKGROUND

Home appliances perform cycles of operation, such as cooking and cleaning. On occasion, the appliance can break down or function improperly. Often, manufacturers will offer a warranty or repair service. During servicing of the appliances, time is spent diagnosing the problem with the appliance or connecting with the appliance to perform a diagnostic test. Upon determining the problem, the repairs must be completed with the servicer's knowledge based upon experience, or the servicer will need to sort through amounts of literature to determine the appropriate way to remedy the problem with the appliance. The entirety of the process increases time to repair the appliance and overall cost for servicing the appliances.

BRIEF DESCRIPTION

In one aspect, an appliance includes a controller having a communication module to communicate with an external server, a first memory in communication with the controller, and a near field communication (NFC) device with a second memory coupled to the controller being configured to communicate with a mobile device proximate to the appliance. The NFC device is further configured to dynamically set a service web address received from the external server and stored in the first or second memory based upon a write command from a mobile device in communication with the NFC device. The controller is configured to parse the stored web service web address in the first or second memory and initiate a set of diagnostic tests based upon the parsed web address.

In another aspect, a method of diagnosing an appliance includes (1) reading, on a mobile device, a predetermined web address form a near field communication (NFC) device in the appliance; (2) accessing, from the mobile device, the predetermined web address at an external server; (3) receiving, on the mobile device, a service web address form the external server; (4) writing the service web address to the NFC device; (5) running diagnostic tests in the appliance; (6) writing diagnostic test results to the NFC device; (7) communicating the diagnostic test results to the external server; and (8) automatically receiving, from the external server, the diagnostic test results on the mobile device.

In another aspect, a method of repairing an appliance includes (1) reading on a mobile device a predetermined web address from a near field communication (NFC) device in the appliance; (2) writing with the mobile device a service web address to the NFC device; (3) running diagnostic tests in the appliance; (4) writing a diagnostic result to the NFC device; (5) reading the diagnostic results from the NFC device with the mobile device; (6) displaying information on the mobile device based upon the diagnostic results; and (7) repairing the appliance utilizing the displayed information.

DETAILED DESCRIPTION

Figure 1:
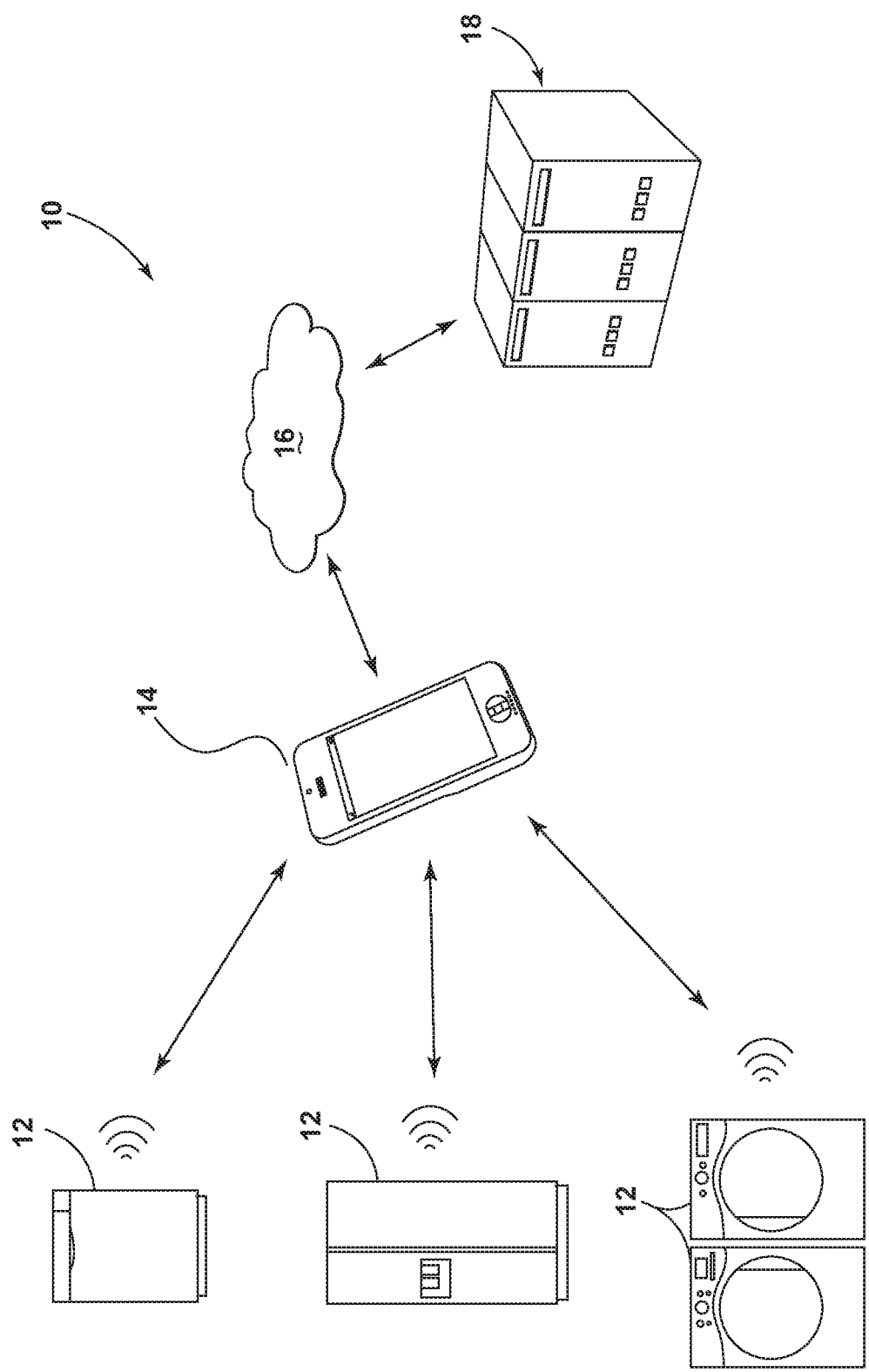
FIG. 1 is a schematic view of a system for transmitting data regarding an appliance for performing a diagnostic for the appliance.

FIG. 1 is a schematic view of a system 10. The system 10 includes at least one appliance 12 in communication with a mobile device 14 via near field communication, hereinafter "NFC." The mobile device 14 can be in communication with a network 16, such as the Internet. The network 16 can provide communication between the mobile device 14 and a server 18, such as a manufacturer server.

The appliances 12 of the system 10 can be a home or domestic appliance that performs a particular job in a home, including those relating to cleaning, cooking, or food preservation. The home appliance 12, for example in the case of a dishwasher, can include a housing at least partially defining a treating chamber (not shown) and having an open face selectively closed by a cover, shown herein as a door, for providing access to the treating chamber. The treating chamber can receive one or more articles, and the appliance 12 can treat the articles according to a useful cycle of operation. Again, in the case of a dishwasher, the treating chamber can receive one or more dishes, and the dishwasher can perform a cleaning system on the dishes in the treating chamber. Other types of appliances 12, including, but not limited to a refrigerator, a clothes washing machine, a clothes dryer, a freezer, a range, a stove, an oven, or a cooktop can be used with the system 10. All of these examples of home appliances can receive one or more articles, and can perform a useful cycle of operation on the articles. Other examples of appliance types typically found within a home and which can be used with the system include an air conditioner, a water heater, and a pool pump.

While three appliances 12 are shown in FIG. 1, it should be understood that the system 10 can include any number of appliances 12 including more or less than three. The appliances 12 can be located within a single home or at a common location, and some or all can be part of a home area network (HAN).

The mobile device 14 can communicate information with and/or respond to requests from the appliances 12 from a remote location, typically near the appliance. The mobile device 14 can include a data storage unit for storing data, such as historical usage or operational data for the appliances 12.

The mobile device 14 can communicate with one or more servers 18. The communication can occur, for example, over a wireless network 16 or the internet. The server 18, in non-limiting examples, can be that of a utility provider, service provider, or manufacturer, and can communicate information, such as repair information including, but not limited to images, videos, and text documents as well as repair instructions. While only one remote device 16 is shown in FIG. 1, it should be understood that the system 10 can include multiple remote devices 16. The remote device 16 can communicate with one or more servers 18 via the wireless network 16 and, in the case where the wireless network 16 is the Internet, can be the same wireless network.

The wireless network 16 can be a private or public network, and can typically be a WAN (wide area network) such as the Internet. Alternatively, it is contemplated that the wireless network 16 can be a HAN, which can be a private or public network, and can typically be a LAN (local area network) and the appliances 12 can the mobile device 14 can communication over the HAN.

The appliances 12 can have one or more user displays and can provide users with access and control of the appliances 12. Through the user display, a repairperson or technician can access information related to the appliance or to a diagnostic of the appliance. The user display 24 can alternatively, for example, comprise a smartphone, a tablet computer, a desktop computer, and a notebook computer to which the appliance is in communication. While not shown in FIG. 1, the user display can be coupled with the wireless network 16.

Appliances naturally have an operational lifetime, as component or elements of the appliances age or degrade over time. Manufacturers or retailers often offer a limited warranty, such that the appliance is guaranteed to properly operate for a predetermined lifetime. However, appliances can break down or malfunction during the initial lifetime and the manufacturer or retailer is required to repair the appliance. The cost associated with repair for an appliance can comprise replacement parts as well as the time required for a repairperson or technician to repair the appliance. Often, diagnosing a problem takes time or a particular level of knowledge and experience. Similarly, repairing the problem can also require additional time as well as knowledge and experience, based upon the complexity of the problem.

The ability to quickly and accurately diagnose and repair the problem with an appliance can significantly decrease time in which the technician spends fixing the appliance. As such, the cost associated with repair decreases. Additionally, the resources required to properly train the technician decreases, requiring less on-site experience to diagnose and repair the problem with the appliance.

Figure 2:
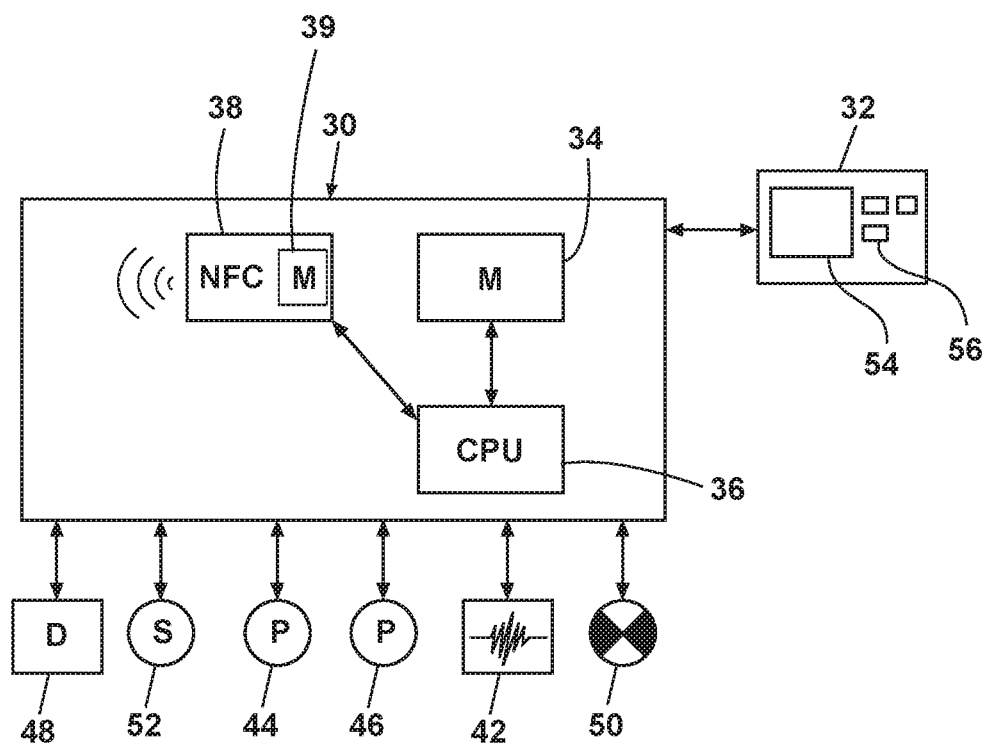
FIG. 2 is a schematic view of a controller of the appliance of FIG. 1.

Referring to FIG. 2, an exemplary controller 30 for the appliances 12 is illustrated. The controller 30 controls the operation of the appliances 12 to implement one or more cycles of operation. The controller 30 can be located within one or more of the appliances 12 and be operably coupled with a control panel or a user interface 32 for receiving user-selected inputs and communicating information to the user. The user interface 32 can include operational controls such as dials, lights, switches, and displays enabling a user to input commands, such as a cycle of operation, to the controller 30, and receive information. The user interface 32 can, for example, include at least one display 54 and at least one selector or button 56. The display 54 can include lights or other discrete indicators with accompanying text, or a graphical user interface, such as a touch screen. The button 56 can include a push button, switch, or dial on the user interface 32 that a user physically actuates, or a virtual button on a graphical user interface, such the display 54. Alternatively or in addition, the user display can be used as a user interface 32 for the appliance, and can be coupled with the controller 30.

Options can be provided for the user to select or control how the appliances 12 operate and perform cycles of operation. Such selections can be made at the appliance 12 or through the user interface 32. For example, the display 54 or button 56 on the user interface 32 of the appliance 12 can be used to activate one of treatment cycle, clean cycle, or otherwise.

As illustrated in FIG. 2, the controller 30 can be provided with a storage medium 34 and a central processing unit (CPU) 36. The storage medium 34 can include any suitable computer-readable media, one non-limiting example of which includes a memory. The storage medium 34 can be used for storing communication software, which is configured to effect communication between the controller 30 and an external network, such as the wireless network 16. The storage medium 34 can also be used for storing control software that is configured to effect one or more cycles of operation by the appliance 12. Examples, without limitation, of cycles of operation in the case of a dishwasher appliance 12 include: Smart Wash, Pots/Pans, Normal Wash, China/Gentle, Fast Wash, and Quick Rinse. The communication and control software can be executed by the CPU 36. The non-transitory storage medium 34 can also be used to store information, such as a database or table, and to store data received from one or more components of the appliance 12 that can be communicably coupled with the controller 30. The database or table can be used to store the various operating parameters for the one or more cycles of operation, including factory default values for the operating parameters and any adjustments to them effected by the control system or by user input.

The controller 30 can also be operably coupled with a near field communication (NFC) device such as a NFC tag 38. The NFC tag 38 has an integrated memory 39 for storage of data which can be read from or written to the NFC tag 38. The NFC tag 38 can be configured at manufacture of the appliance 12 to contain general appliance or manufacturer information stored on the memory 39, such as a predetermined web address, a model number, a serial number, and default settings in non-limiting examples. The NFC tag 38 is readable and rewritable, such that the controller 30 can write new information to the memory 39 based upon operation of the appliance 12 or the controller 30. The controller 30 and CPU 36 can parse the predetermined web address on the NFC tag 38 to initiate one or more diagnostic tests based upon the parsed web address. Alternatively, it is contemplated that the NFC tag 38 may not have an integrated memory, and utilize the storage medium 34 within the controller 30 as a memory device for the NFC tag 38. As such, the NFC tag 38 would operate without the integrated memory, having the ability to read, write, or rewrite to the storage medium 34 within the controller 30.

The controller 30 can be operably coupled with one or more components of the appliance 12 for communicating with and controlling the operation of the component to complete a cycle of operation. For example, in the case of a dishwasher as the appliance 12, the controller 30 can be operably coupled with a heater 42 for heating wash liquid during a cycle of operation, a drain pump 44 for draining liquid from the treating chamber, a recirculation pump 46 for recirculating wash liquid during a cycle of operation, a dispenser 48 for dispensing a treating agent during a cycle of operation, one or more valve(s)s 50 for controlling the flow of liquid or air through the treating chamber, and one or more sensor(s) 52 to control the operation of these and other components to implement one or more of the cycles of operation. Non-limiting examples of a sensor 52 that can be communicably coupled with the controller 30 include a temperature sensor and a turbidity sensor to determine the soil load associated with a selected grouping of dishes, such as the dishes associated with a particular area of the treating chamber. In the case of other types of home appliances, the controller 30 can be operably coupled with components typical to such appliances that are commonly controlled.

The previously described system 10 and one or more appliances 12 can comprise an apparatus necessary for facilitating the repair of the appliances 12 and provide the structure necessary for the implementation of a method of for diagnosing one or more problems associated with the appliance 12. Embodiments of the method function to determine a problem associated with the appliance and facilitating resolution of the problem with a technician.

Figure 3:
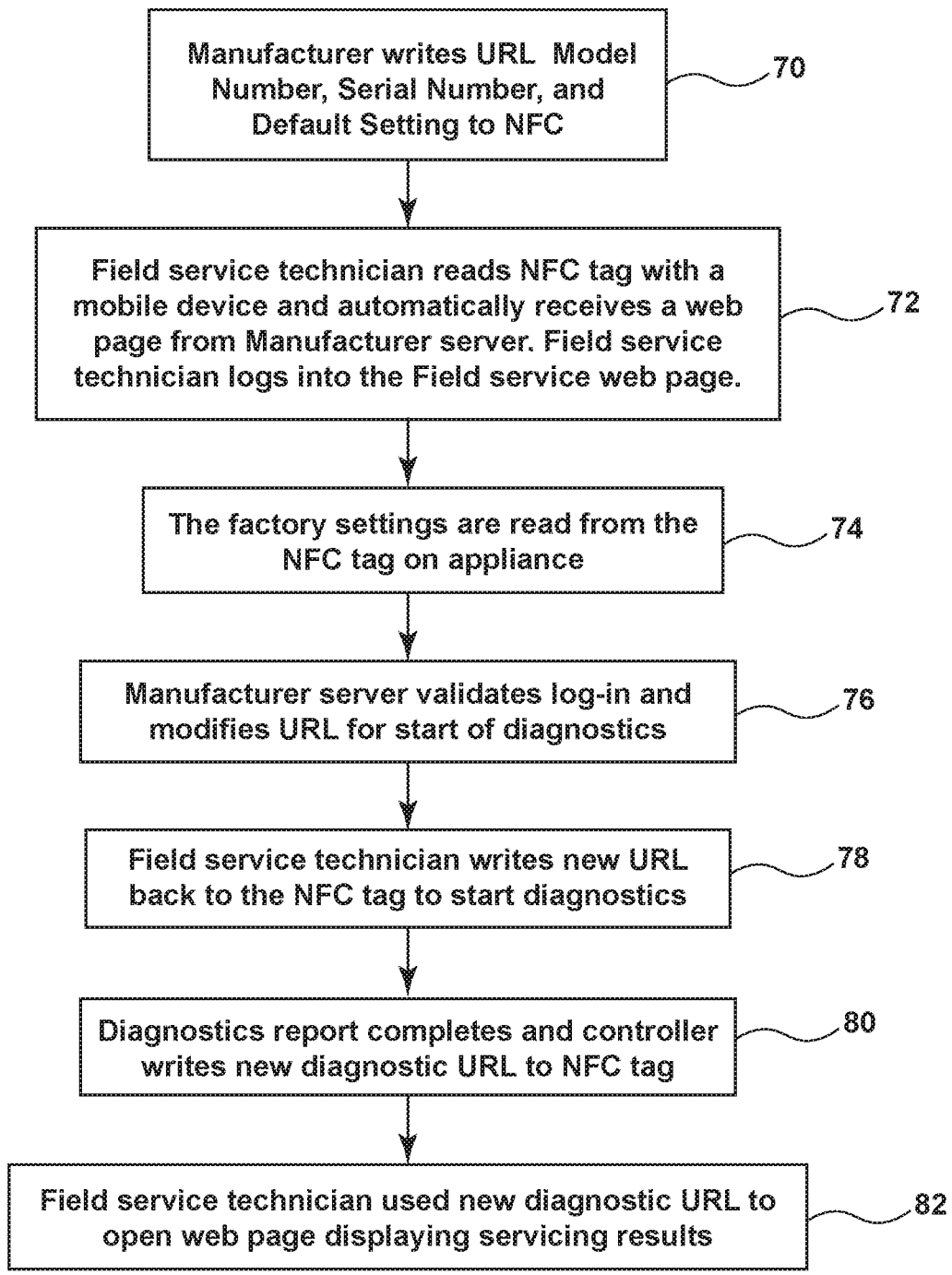
FIG. 3 is a flow chart illustrating a method for performing a diagnostic for the appliance.

Turning now to FIG. 3, a flow chart illustrates a method of diagnosing one or more of the appliances 12. At 70, during manufacture of the appliance 12, the manufacturer will write a web address or URL, a model number, serial number, and default settings to the NFC tag 38. The appliance 12 will experience a problem or malfunction requiring a field service technician to diagnose and repair the appliance 12 locally, typically within a consumer's home. At 72, the field service technician will use a mobile device 14 to read the NFC tag 38 within the appliance. The mobile device 14 can read the NFC tag 38 by being positioned within close proximity to the NFC tag 38, for example, by placing the mobile device 14 against the appliance 12 near the internal controller 30. The field service technician will be familiar with the position of the NFC tag 38 in order to enable the mobile device 14 to read the NFC tag 38. The mobile device 14, comprising a user interface or display, will utilize the web address or URL to automatically receive a web page on the mobile device 14 from the manufacturer server 18. The web page will contain a log-in user interface to which the field service technician can log-into, bringing the field service technician to a field service web page.

At 74, additionally when the NFC tag 38 is read, the factory settings of the appliance 12 can be imported to the web page. When the technician logs into the page, the manufacturer web page will be one particularized to the model of the appliance. At 76, after log-in is validated by the manufacturer server 18, the URL from the NFC tag will be modified by the manufacturer server 18 and loaded to the web page on the mobile device 14. The new URL will contain a string or data, which can be read by the appliance 12 to start a diagnostic determination for the appliance 12. At 78, the field service technician holds the mobile device 14 near the NFC tag 38 and writes the new URL back to the NFC tag 38 with the string or data to begin diagnosis of the appliance. Upon determination of the controller 30 of the updated NFC tag URL, or instruction to the controller 30 by the field service technician at the user interface 32, the controller 30 reads the new URL from the NFC tag 38 and the appliance begins a diagnostics cycle. The diagnostics cycle can perform multiple tests or functionalities of the appliance 12, providing a results and determining a status of a particular element of the appliance as working properly or improperly.

At 80, the diagnostics process of the appliance 12 will complete and the controller 30 will determine a diagnostics report. The controller 30 will write another new URL to the NFC tag 38, which will contain a new string or data representative of the diagnostics report result. The field service technician places the mobile device 14 near the NFC tag 38 and the mobile device 14 reads the new URL from the NFC tag 38 and, at 82, opens a web page displaying servicing results related to the diagnostics report. The web page can contain information specifically tailored to the appliance 12 as well as the particular problem diagnosed by the appliance 12. The information can comprise images, videos, and texts, as well as detailed repair instructions for the particular problems determine by the diagnostics. The field service technician can follow the instructions for repairing the appliance 12 as well as use any images or videos to facilitate repair of the appliance.

Figure 5:
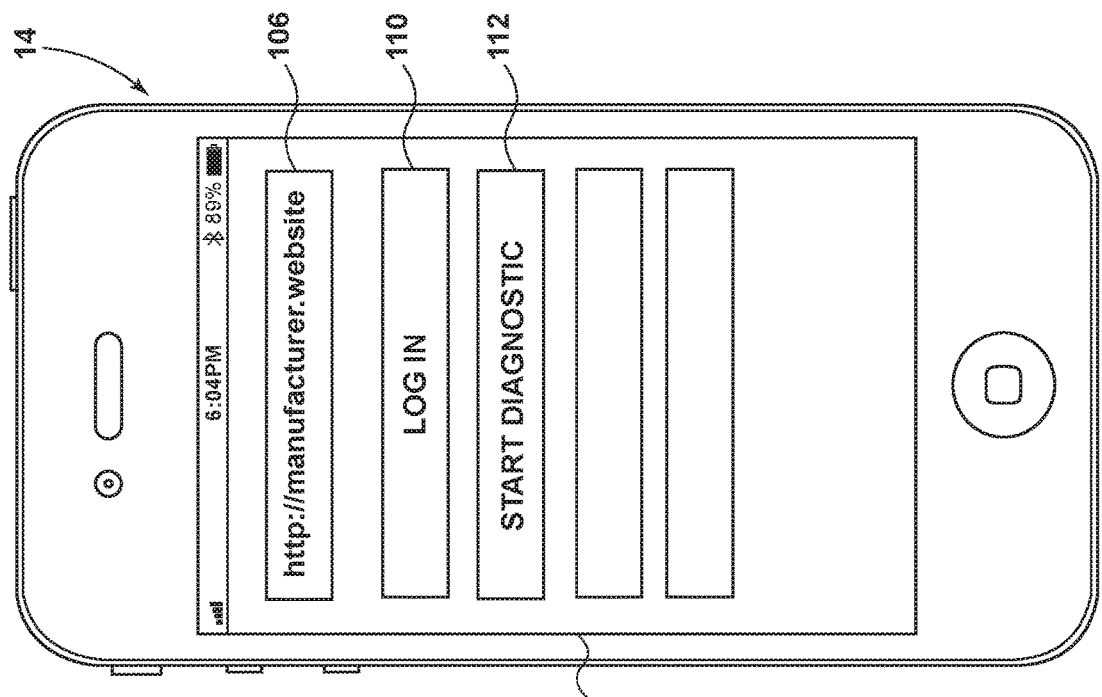
FIG. 5 is a view of the mobile device of FIG. 4 showing another screen after reading a NFC tag on the appliance.
Figure 4:
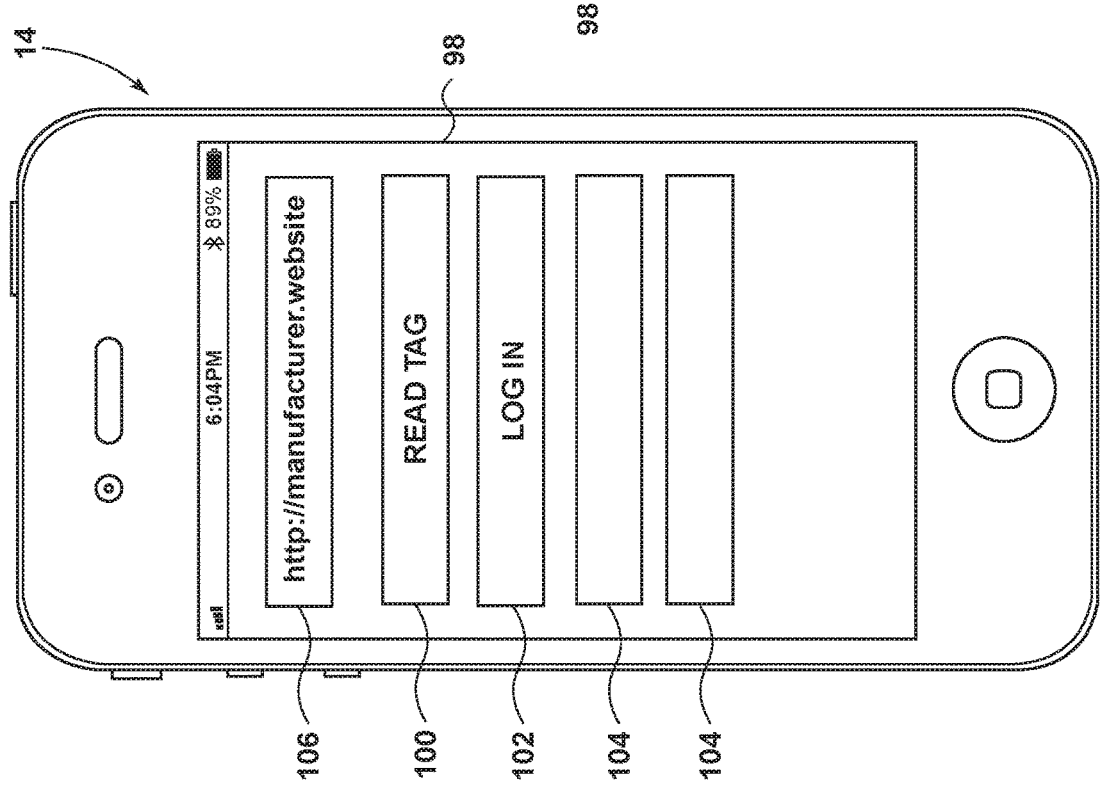
FIG. 4 is a view of a mobile device showing an initial screen for reading a NFC tag on the appliance.
Figure 6:
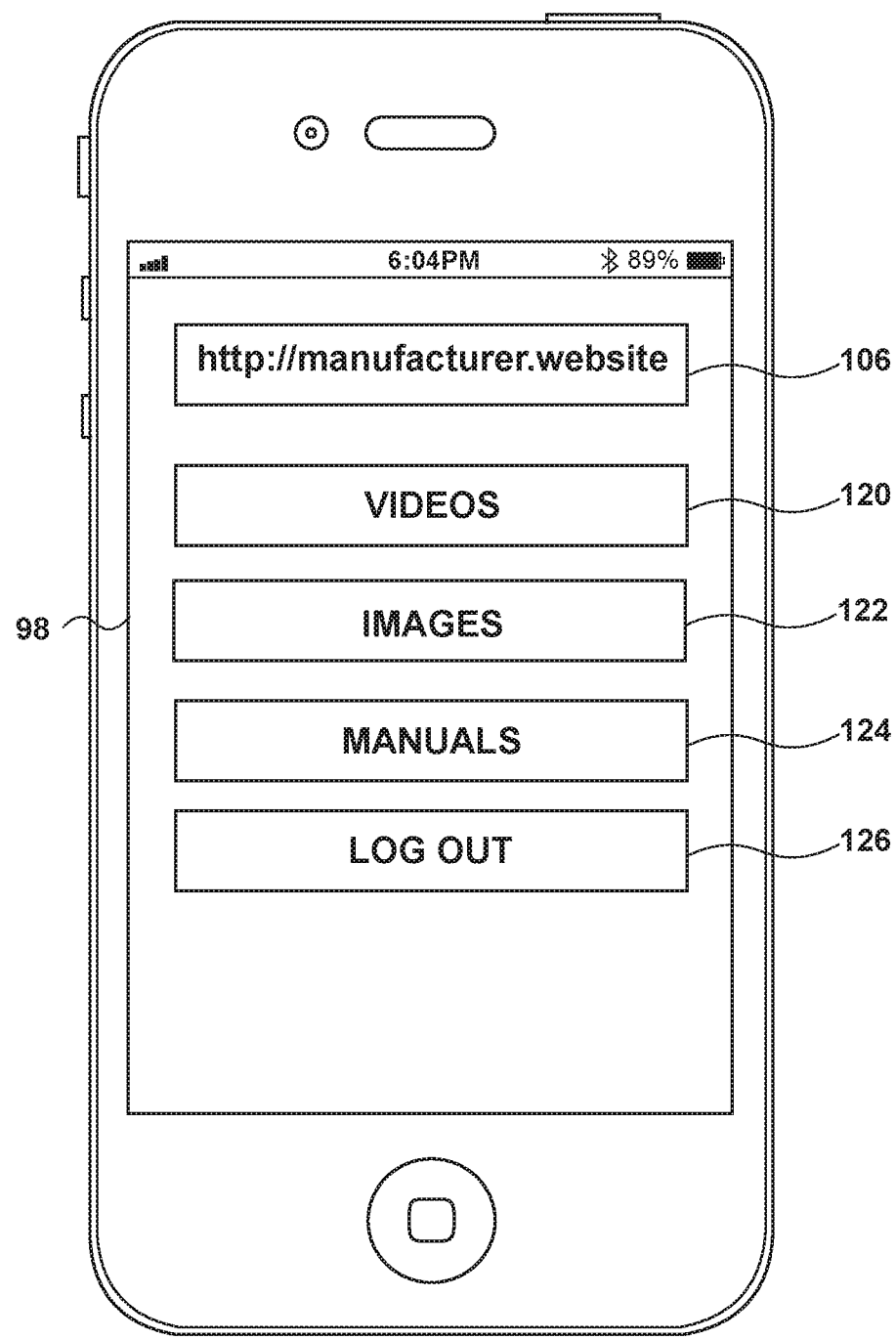
FIG. 6 is a view of the mobile device of FIG. 4 showing another screen after reading an updated NFC tag on the appliance.

Looking at FIGS. 4-6, an exemplary mobile device 14, shown as a mobile phone, illustrates different displays during the diagnosis and repair process. In FIG. 4, an initial manufacturer web page 98 can be loaded by the field service technician prior to beginning the diagnosis process. A predetermined URL 106 can be utilized by the field service technician for logging into the manufacturer website with a button 102, or to instruct the mobile device 14 to read a nearby NFC tag with button 100. Alternatively, as many mobile devices 14 such as mobile phones are NFC enabled, the field service technician need only place the mobile device 14 near the NFC tag 38 and the mobile phone will automatically open the manufacturer web page 98 based upon the read NFC tag 38. The manufacturer web page 98 can have additional buttons providing for additional functionalities, such as a call button directing the mobile device 14 to call a field service technician assistance line, or other functionalities in non-limiting examples.

Turning now to FIG. 5, after reading the NFC tag 38 on the appliance 12, the mobile device 14 will be directed to a different manufacturer web page 98 with a button 110 to log-in or with a start diagnostic button 112 if the field service technician is already logged in. The log-in button 110 will direct the field service technician to a separate web page 98, requiring, for example, a user name and a password to grant access to the manufacturer server 18 through the field service technician's mobile device. After logging into the server 18, the field service technician will be re-directed to another page comprising a start diagnostic button 112. The start diagnostic button 112 will cause the mobile device 14 to write a new URL to the NFC tag 38 on the appliance 12, which contains the data instructing the appliance 12 to begin a diagnostic process to determine problems with the appliance 12.

Looking now at FIG. 6, after the appliance has finished the diagnosis process, the controller 30 writes a new URL to the NFC tag 38 with information or data representative of the diagnostic result. The mobile device 14 is again placed near the NFC tag 38 and reads the new URL. The mobile device 14 can automatically open a new web page 98 tailored to either the particular appliance 12 or to the particular problem associated with the diagnosis of the appliance 12. The new web page 98 can display or have buttons linked to particular information related to the appliance or the problem. The web page 98 can have uploaded videos 120, images 122, manuals 124, as well as a log-out feature once repair is completed.

It should be appreciated that the apparatus and method described herein provide for a quick and easy way for a field service technician to connect to an appliance at a remote site such as a consumer's home. The field service technician only needs a mobile device such as a mobile phone which are now commonplace. With the mobile device used in combination with the readable and rewritable NFC tag, the field service technician can quickly connect to the appliance and instruct the appliance to begin a diagnostic process. The field service technician then receives a diagnosis report to the mobile device, which automatically displays manuals, instructions, and other relevant media tailored to the problem with the appliance. The field service technician can then quickly and effectively remedy the problem with the appliance.

The apparatus and method improve upon current diagnostics methods, which require a field service technician to remember a key sequence to put the appliance into diagnostic mode as well as interpret a short, often 3-4 character code, in an attempt to repair the appliance. The technician is linked to a manufacturer server and provided information specifically tailored to both the appliance and the problem with the appliance. Thus, repair and diagnosis are hastened, reducing overall repair costs to the manufacturer or retailer.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An appliance comprising:
   a controller having a communication module to communicate with an external server;
   a first memory in communication with the controller; and
   a near field communication (NFC) device with a second memory and coupled to the controller and configured to communicate with a mobile device proximate the appliance;
   wherein the NFC device is further configured to dynamically set a service web address received from the external server and stored in the first memory or the second memory based upon a command from the mobile device in communication with the NFC device;
   wherein the controller is configured to parse the stored service web address in the first or second memory and initiate a set of diagnostic tests based upon the parsed web address;
   wherein the set of diagnostic tests is received from the service web address specific to the appliance;
   wherein the set of diagnostic tests determines a second service web address based upon a result from the set of diagnostic tests; and
   wherein the appliance is serviceable based upon information at the second service web address correlating to the result of the set of diagnostic tests.

2. The appliance of claim 1 wherein the NFC device is a NFC tag comprising a predetermined web address, a model number, a serial number, and default settings so that when the mobile device is in communication with the NFC tag, the mobile device can read the predetermined web address, access the predetermined web address, and receive the service web address for at least one of the model number, serial number, or default settings.

3. The appliance of claim 2 wherein the controller is configured to run the set of diagnostic tests.

4. The appliance of claim 1 wherein the controller is configured to run the set of diagnostic tests.

5. The appliance of claim 1 wherein the second service web address is written to the NFC device.

6. The appliance of claim 5 wherein the mobile device reads the second service web address from the NFC device and directs a user to a web page having information related to the result from the set of diagnostic tests.

7. The appliance of claim 6 wherein the web page includes at least one of images, videos, texts, and repair instructions.

8. The appliance of claim 6 wherein the web page includes servicing results tailored to the appliance.

9. The appliance of claim 1 wherein the appliance comprises one of a washer, a dryer, a refrigerator, a stove, an oven, a microwave, a garbage disposal, a composter, a refresher, or a compactor.

10. A method of diagnosing an appliance comprising:
    reading on a mobile device a first web address from a near field communication (NFC) device in the appliance by positioning the mobile device adjacent the appliance;
    accessing, from the mobile device, the first web address at an external server;
    receiving, on the mobile device, a second web address from the external server;
    writing the second web address to a NFC memory in the NFC device by positioning the mobile device adjacent the appliance;
    reading, with a controller of the appliance, the second web address written to the NFC memory;
    running at least one diagnostic test in the appliance based upon an instruction from the controller of the appliance wherein the instruction is related to the second web address, to determine a diagnostic test result;
    generating a third web address, with the controller of the appliance, representative of the diagnostic test result;
    writing the third web address to the NFC device;
    reading the third web address with the mobile device by positioning the mobile device adjacent the appliance; and
    displaying the third web address on the mobile device as a web page.

11. The method of claim 10 further comprising placing on the NFC device a predetermined web address, a model number, a serial number, and defaults settings during manufacture.

12. The method of claim 10 further comprising automatically receiving at least one of instructions, manuals, or videos on the web page.

13. The method of claim 10 further comprising logging into the external server from a predetermined web address.

14. The method of claim 10 wherein displaying the web page includes displaying at least one of images, videos, texts, and repair instructions.

15. The method of claim 10 wherein displaying the web page includes displaying servicing results tailored to the appliance.

16. A method of servicing an appliance comprising:
    reading on a mobile device a first web address from a near field communication (NFC) device in the appliance;
    accessing from the mobile device the first web address at an external server;
    receiving on the mobile device a second web address from the external server;
    writing the second web address to a NFC memory in the NFC device;
    running at least one diagnostic test in the appliance with a controller of the appliance, based upon the second web address, to determine a diagnostic test result;
    writing a third web address to the NFC memory based upon the diagnostic test result;
    communicating the third web address to the mobile device;
    displaying the diagnostic test result on the mobile device at the third web address; and
    servicing the appliance based upon the diagnostic test result displayed on the mobile device.

17. The method of claim 16 wherein displaying information further comprises displaying at least one of instructions, manuals, or videos.

18. The method of claim 16 further comprising writing information to the NFC device during manufacture.

19. The method of claim 18 wherein the writing information further comprises writing a predetermined web address, a model number, a serial number, and defaults settings to the NFC device.

* * * * *